United States Patent [19]
Keller

[11] 3,958,966
[45] May 25, 1976

[54] SEPARATOR MEMBER FOR SEPARATING SOLIDS FROM GASEOUS MEDIA

[75] Inventor: Herbert Keller, Mulheim, Germany

[73] Assignee: Kraftwerk Union Aktiengesellschaft, Mulheim (Ruhr), Germany

[22] Filed: Oct. 18, 1974

[21] Appl. No.: 515,826

[30] Foreign Application Priority Data
Oct. 18, 1973 Germany............................ 2352335

[52] U.S. Cl............................... 55/442; 55/DIG. 37
[51] Int. Cl.²........................................ B01D 45/04
[58] Field of Search ............ 55/308, 397, 398, 436, 55/440, 442, 443, 444, 445, 446, DIG. 23, DIG. 37

[56] References Cited
UNITED STATES PATENTS

| | | | |
|---|---|---|---|
| 428,067 | 5/1890 | Briggs | 55/445 |
| 2,506,273 | 5/1950 | Linderoth | 55/444 X |
| 3,190,058 | 6/1965 | Farr et al. | 55/442 X |
| 3,375,058 | 3/1968 | Petersen et al. | 55/442 X |
| 3,693,328 | 9/1972 | Paucha | 55/440 X |

FOREIGN PATENTS OR APPLICATIONS

| | | | |
|---|---|---|---|
| 368,667 | 2/1923 | Germany | 55/397 |

Primary Examiner—Frank W. Lutter
Assistant Examiner—David L. Lacey
Attorney, Agent, or Firm—Herbert L. Lerner

[57] ABSTRACT

A separator member is formed of separator elements having the cross section of a substantially obtuse triangle and extending obliquely staggered behind and mutually spaced from one another, one side of the triangle extending parallel to the flow direction, pairs of adjacent separator elements, respectively, defining a flow channel flaring outwardly in downstream flow direction. For direct installation into a steam line, the separator member is of conical construction with annular separator elements of increasing diameter.

7 Claims, 5 Drawing Figures

SEPARATOR MEMBER FOR SEPARATING SOLIDS FROM GASEOUS MEDIA

The invention relates to a separator member for separating solids from a gaseous, flowing medium, especially steam, the separator member having several separator elements disposed parallel to each other, and between which passageways for the medium to be purified are formed.

Such separator members which are known, for example, from the German Published Prosecuted Application DAS 1,198,833 and German Pat. No. 967,766, have the purpose, for example, in the construction of turbines, to separate from the flowing steam foreign matter that is contained in the steam flowing toward the turbine. They therefore fulfull a protective function for the valves, vanes and shaft seals. These heretofore known separator members generally display cylindrical or conical separator surfaces with a flow perpendicular to their external surface, a large number of small flow apertures being formed by borings, fabric or wound strips. These separator members are installed in the valve housing or in special separator housings separated therefrom.

Ordinarily, the sum of the narrowest free flow cross sections is then several times the nominal cross section of the pipeline. The pressure loss is thereby about the order of magnitude of one to two times the pressure head in the pipeline and accordingly results in a reduction of the thermodynamic efficiency of the steam turbine of about 0.2%.

For a given steam velocity and given pressure, the volumetric flow increases in such separators with the square or second power of the linear dimensions, while the material expended increases with the third power. The costs of steam separators thereby increase progressively per unit of power with increasing turbine outputs. In addition, however, the stresses of the separator members are also greater with increased steam flow and, consequently, with larger filter surface areas, so that disproportionately large support structures for the separator member proper become necessary, thereby also increasing the flow loss, in addition.

It is accordingly an object of the invention to provide a separator member which has a pressure loss that is only about one-half the loss of conventional separator members and which, in addition, requires no separate separator housing due to its compact construction, but has itself sufficient mechanical strength also for very high temperature differences.

With the foregoing and other objects in view, there is provided, in accordance with the invention, a separator member for separating solids from a gaseous flowing medium comprising a plurality of mutually parallel separator elements defining therebetween respective passageways for a gaseous flowing medium that is to be cleansed of solids, the separator elements having a cross section substantially shaped as an obtuse triangle and extending obliquely staggered behind and mutually spaced from one another, transversely to the direction of flow of the medium, one side of the triangle extending parallel to the flow direction, each respective pair of adjacent separator elements defining a flow channel that extends initially at an angle to the flow direction and then gradually merging again downstream into the flow direction.

In accordance with other features of the invention, the flow channel has a cross section flaring outwardly like a diffusor in downstream direction, one of the down-stream sides of the separator elements being advantageously curved concavely and the other convexly.

With this type of construction, a separate separator housing is no longer required, but, in accordance with a further feature of the invention, the separator member can be installed directly in the existing flow space, such as, for example, a pipeline.

In accordance with an additional feature of the invention, the separator member is of conical shape and the separator elements are annular and have respective diameters increasing from stage to stage from the apex to the base of the cone. Furthermore, the separator member can be installed in the pipeline either in or against the direction of flow.

Other features which are considered as characteristic for the invention are set forth in the appended claims.

Although the invention is illustrated and described herein as embodied in separator member for separating solids from gaseous media, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
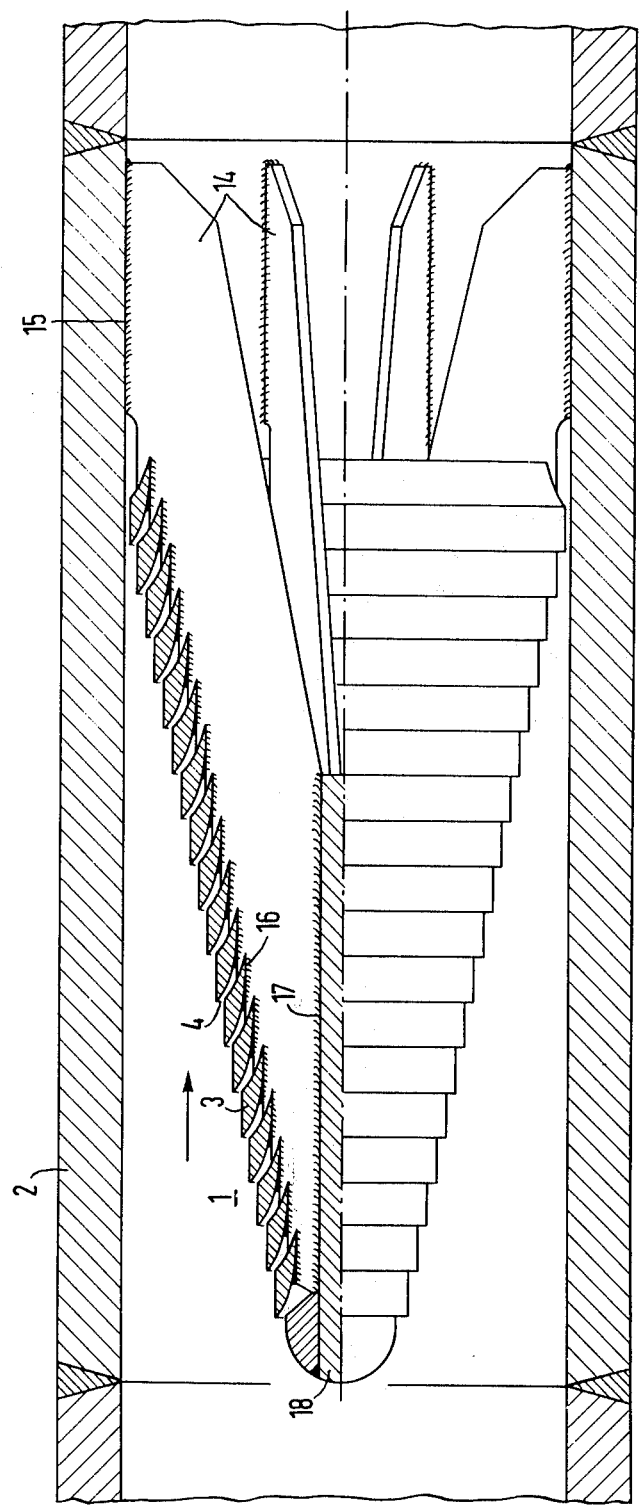
FIG. 1 is a longitudinal sectional view of a substantially conical separator member according to the invention, which is directly installed in a steam line with the point or apex thereof extending in direction opposite the steam flow direction.
Figure 2:
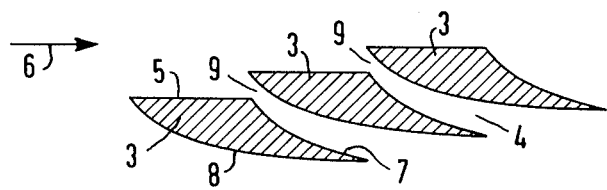
FIGS. 2 and 3 are fragmentary views of FIG. 1 showing modifications in the layout or mutual relationship of the individual separator elements of the separator member.

Referring now to the drawing and first, particularly to FIG. 1 thereof, there is shown an embodiment of a separator member 1 according to the invention directly installed in a live-steam pipeline 2. The separator member 1 has a substantially conical shape and is installed in the pipeline 2 with the apex thereof extending in a direction opposite to the steam flow direction that is represented by the associated arrow. The separator member 1 is formed of individual annular separator elements 3, which are disposed obliquely staggered one behind the other and with mutual spacing, so that, between respective pairs of annular separator elements 3, a flow channel 4 is formed. As can be seen from the sectional view of three parallel separator elements 3 in FIG. 2, each separator element in cross section has the appearance substantially of an obtuse triangle. These separator elements 3 are disposed in a manner that one side 5 of each triangle always lies parallel to the steam flow direction represented by the arrow 6 while, of those surfaces of the separator elements 3 located at the discharge side, the upper side or surface 7 is formed with a concave curve and the lower side or surface 8 is formed with a convex curve, as viewed in FIG. 2. The individual elements 3 are disposed in such a mutually staggered manner that a separator gap 9 is formed between each pair of succeeding separator elements 3, the respective separator gaps 9 changing into a Venturi-like widened discharge channel 4 between the separator elements in the embodiment shown in FIG. 2. The cross sections in the channels 4 of the separator member 1 and the cross sections, moments of resistance or section modulus and moments of inertia of the separator elements 3, required for reasons of strength and rigidity, are matched by a deflection directed initially in substantially radial direction, and thereafter followed by a gradual deflection into axial direction so that, with adequate strength or rigidity, minimal flow losses are produced that are only about half as large as those in heretoforeknown conventional separators. For a given cross section of the separator channels 4, which advantageously corresponds to the cross section of a Venturi tube, channels with greater deflection thus have an effect in the sense of increased strength, and channels with less deflection in the sense of smaller pressure losses. The inventive deflection of the steam flow back again into the main flow direction prior to the discharge thereof from the channels 4 avoids the necessity for the velocity profile of the pipe flow to be built up again behind the separator cross sections under fall or head loss. This head loss is also the reason why in conventional separator bodies, no matter how large the separator surface area, the loss coefficient of these separators with respect to the velocity in the pipeline, is greater than "1".

Figure 3:
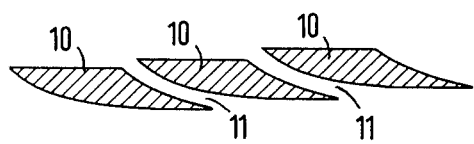

Depending upon the requirements as to strength, pressure loss and cost of construction, the ratio $f$ (the ratio of the sum of the narrowest cross sections to the inner tube cross section) in the order of magnitude of 0.3 to 0.9 will represent an optimum in a separator body according to the invention. The coordination of the separator elements 3 according to FIG. 2 results in an $f$ of 0.5, whereas with a separator element disposition according to FIG. 3 an $f = 1$ is obtained. The separator elements 10 have a flatter cross section and smaller diameter differences from stage to stage. In this connection, it is also unnecessary for the discharge channels 11 to be constructed in the form of a diffusor, because the flow cross section experiences no variation thereof along the entire length of the separator member. With comparable cross sections of the separator elements, the structural length of a separator member having a disposition according to FIG. 3 is about twice as long as one having the layout according to FIG. 2.

Figure 4:
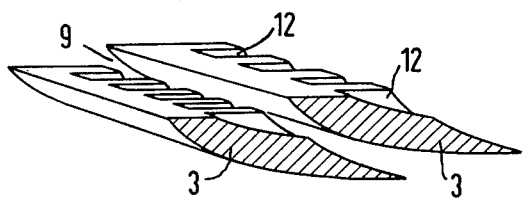
FIG. 4 is a perspective and partly sectional view of a special embodiment of the separator elements.

For the same external dimensions, especially equal numbers of rings, equal gap width and approximately equal strength, the sum of the narrowest cross sections can be increased still further, however, if comb-like slots 12 extending in the flow direction are cut into the separator elements 3 in the region of the separator gaps 9, as seen in FIG. 4 in perspective view. Thereby, the pressure losses can be even more considerably reduced.

The separator elements 3 of the separator member 1 according to FIG. 1 are then held by a support structure formed of webs 14 which are coordinated in stellar fashion one with the other and are disposed on the discharge side of the separator member. These webs 14 extend parallel to the outer surface of the separator and are provided at the outer edge thereof with suitable incisions 16 for receiving therein the individual separator elements 3. This connection should be provided outside the region of the narrowest cross section, in order to avoid an unnecessary degradation of the ratio $f$. The webs 14 are firmly connected, for example, by welding to the pipeline 2 at the location 15 downstream of the radially outermost separator elements, and are welded together at the other ends 17 thereof located in the conical point of the separator member 1. A thermoelastic construction of the star-shaped support member can be realized by the fact that the attachment points 15 at the wall of the pipe are located amongst one another in a cross-sectional plane other than that in which the attachment points 17 of the webs 14 are located. With very long separator members 1, it may moreover be advantageous to provide axial guidance for the separator member 1 at the point or apex 18 thereof.

Because all of the separator cross sections in such a construction of the separator member are located in the projection of the inner cross section of the pipe, a single located opening in the pipeline ahead or upstream of the separator is sufficient for inspecting and cleaning the separator member.

Figure 5:
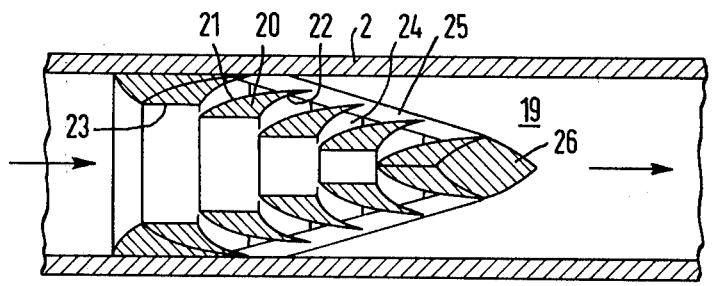
FIG. 5 is a longitudinal sectional view of another embodiment of the substantially conical separator body of FIG. 1 shown installed in a pipeline with the apex or point thereof extending in flow direction therein.

In FIG. 5 another embodiment of a conical separator 19 according to the invention is shown. It is, however, built into a pipeline 2 with the point or apex 26 thereof extending in the flow direction represented by the associated arrows. The individual annular separator elements 20 have a triangular cross section corresponding to that of the separator elements 3 according to FIG. 1, however, in the embodiment of FIG. 5, the separator elements with the largest cross section are disposed first in the flow direction only, and then those with cross sections decreasing from stage to stage. Moreover, in these separator elements 20, the one side 23 of the triangle is also parallel to the oncoming flow direction, whereas on the discharge side, the upper sides 21 are curved convexly and the lower sides 22 concavely. Also, in this connection, corresponding discharge channels 24 flaring out in diffusor-fashion result therefrom. The individual separator elements 20 are retained on the discharge side by appropriate webs 25.

The construction of the separator in accordance with the invention is shown in the drawings as having a rotationally symmetrical development. Such a rotationally symmetrical construction, however, is not absolutely necessary. Rather, a louver-like arrangement of straight separator elements can also be provided for installation in housings or rectangular cross sections, the straight separator elements being held at their ends per se or through separated webs which extend parallel to the separator surface. The utility of the inventive separators is furthermore, not limited to steam turbines; such separator members according to the invention can find use generally inflow engine construction, in reactor technology and in general process technology.

It is claimed:

1. Cone-shaped separator-body having a tip and a foot for separating solids from a gaseous medium comprising a substantially hollow elongated member comprising a plurality of annular separator elements disposed concentrically behind each other in longitudinal axial direction of said elongated member and each having an outer and an inner peripheral surface, the diameter of each separator element in the direction from the tip to the foot of said coneshaped separator-body increasing from element to element, the cross section of each separator element being shaped substantially as an obtuse triangle having a base-side lying parallel to the axis of said elongated member and coextensive with the width of one of the peripheral surfaces of each separator element, and two other sides starting from said base-side and pointing generally in said longitudinal axial direction, one of the two other sides of each of two mutually adjacent separator elements defining therebetween a gradually enlarging flow channel extending in a direction continuously varying from being transverse to said longitudinal axial direction to being substantially parallel thereto, and a gap at the entrance of said flow channel between two adjacent separator elements whereby the solids are separated from the gaseous medium.

2. Cone-shaped separator-body according to claim 1 wherein said flow channel has a cross section flaring outwardly like a diffuser in the direction from the tip to the foot of the cone-shaped separator-body.

3. Cone-shaped separator-body according to claim 1 wherein the spacing between adjacent separator elements is of varying width, said separator elements having a side thereof formed with comb-like grooves extending in said longitudinal axial direction from the tip to the foot of the cone-shaped separator-body in the region of narrowest spacing of the respective separator element to the next-following separator element.

4. Cone-shaped separator-body according to claim 1 in combination with a pipeline having an inlet and an outlet for gaseous medium, the separator body being installed in said pipeline with the apex thereof extending toward said outlet of said pipeline.

5. Cone-shaped separator-body according to claim 1 in combination with a pipeline having an inlet and an outlet for gaseous medium, the separator-body being installed in said pipeline, and including a support structure holding said separator elements, said support structure comprising a plurality of webs coordinated in a stellar fashion one with the other and disposed in said pipeline between said inlet thereof and said separator elements, said webs being secured beyond the foot of said separator elements to the inner wall surface of said pipeline and being connected in the interior of the separator-body both to said separator elements and to one another.

6. Cone-shaped separator-body according to claim 5 wherein said webs are formed with incisions wherein said separator elements are received.

7. Cone-shaped separator-body according to claim 1 including a plurality of webs holding said separator elements, said webs extending substantially parallel to the outer separator surface.

* * * * *